ALFRED JOHN ALEXANDER INVENTORS
GEOFFREY STANLEY BISHOP
ANDREW FRANCIS VINCEN LEAT
MICHAEL JOHN TOOZE.

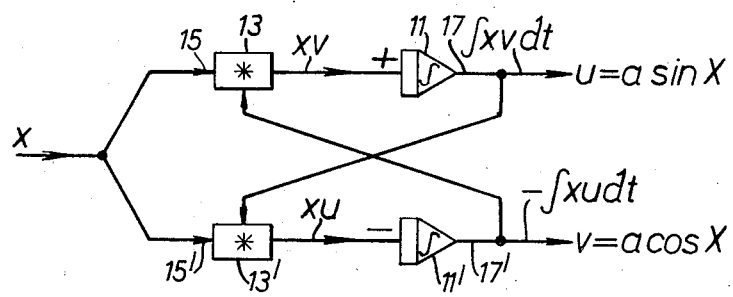
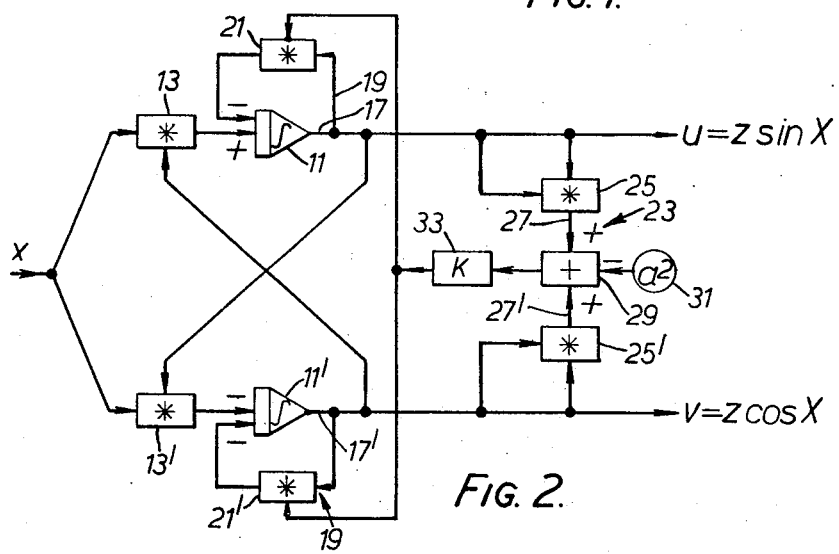
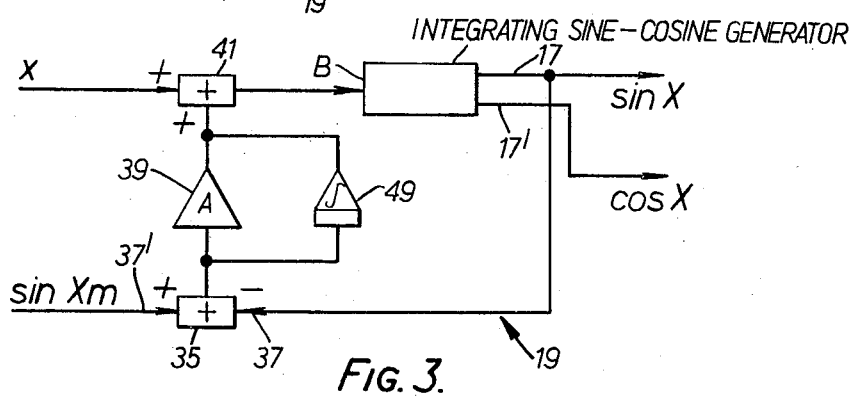

United States Patent Office 3,500,031
Patented Mar. 10, 1970

3,500,031
FUNCTION GENERATORS
Alfred John Alexander, Geoffrey Stanley Bishop, Andrew Francis Vincent Leat, and Michael John Tooze, London, England, assignors to Elliott Brothers (London) Limited, London, England, a British company
Filed Dec. 5, 1967, Ser. No. 688,061
Claims priority, application Great Britain, Dec. 9, 1966, 55,208/66
Int. Cl. G06g 7/22
U.S. Cl. 235—186                                                16 Claims

ABSTRACT OF THE DISCLOSURE

A function generator for producing a sine and cosine output of an angle in response to a time rate change of angle input, includes feedback means responsive to the function generator output to control at least one of the signal parameters of amplitude and phase of the sine and cosine outputs.

---

This invention relates to function generators, and, more particularly is concerned with function generators operative in response to an input signal representing the time rate of change of an angle, to develop output signals representing the sine and cosine of the angle at any instant.

In a previously proposed circuit for producing such output signals in response to such a rate signal, two integrators are provided, the positive input of one being connected to the output of one multiplier circuit and the negative input of the other being connected to the output of another multiplier circuit, the output of each integrator is connected to an input of the multiplier circuit connected to the input of the other integrator; and the rate signal is, in operation, supplied to both multiplier circuits. The sine and cosine signals are produced respectively at the output of the two integrators.

The previously proposed circuit suffers from certain defects which severely limit its utility. It can be shown that if the rate signal is denoted by the symbol $x$, the two output signals will be $u = a \sin X$, $v = a \cos X$.

In these equations $$X = b + \int_0^{t_1} x(t) dt$$

The amplitude and phase parameters, $a$ and $b$ respectively are arbitrary; not only are they arbitrary, they are also subject to variation as a result of imperfections in the integrators and multipliers, such variation results from drift in the case of the integrators, and null, and possibly scale, error in the case of the multipliers.

According to the present invention there is provided a function generator, comprising a first and a second integrator, a first and a second multiplier circuit, the outputs of said first and second multiplier circuits being respectively connected to the inputs of said first and second integrators, the outputs of the first and second integrators being respectively connected to the inputs of the second and first multiplier circuits whereby, in response to an input signal representing the time rate of change of an angle and supplied simultaneously to the inputs of the multiplier circuits, an output signal representing the sine of the angle is developed at the output of said first integrator and an output signal representing the cosine of the angle is developed at the output of said second integrator, and feed-back means responsive to the outputs of said integrators for controlling at least one of the signal parameters of amplitude and phase of each said sine and cosine output signal.

Function generators embodying the invention will now be described by way of example with reference to the accompanying diagrammatic drawings in which:

FIGURE 1 is a schematic circuit diagram of a previously proposed form of function generator;

FIGURE 2 is a schematic circuit diagram of a function generator according to the invention in which the sinusoidal outputs of the generator may be controlled as to amplitude; and FIGURES 3 to 8 are schematic circuit diagrams of function generators according to the invention in which the sinusoidal outputs are controlled as to phase.

Figure 4:
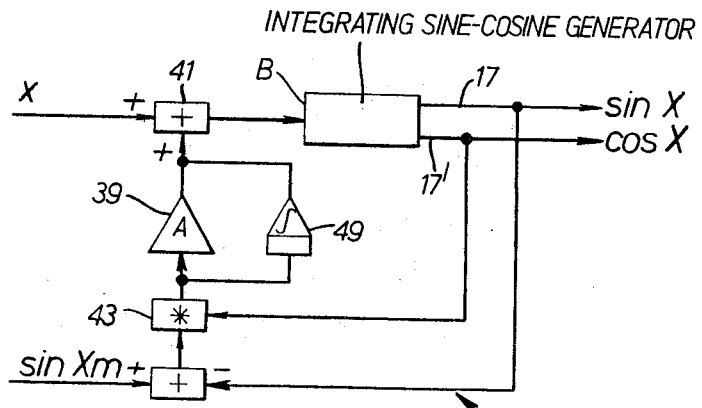

The function generator in the form of an integrating sine-cosine generator (FIGURE 1) comprises first and second integrators 11, 11' and first and second multiplier circuits 13, 13'. The outputs of the first and second integrators 11, 11' are respectively connected to the inputs of the second and first multiplier circuits 13', 13. In response to an input signal $x$ representing rate of change of an angle, supplied simultaneously to inputs 15, 15' of the multiplier circuits 13, 13', an output signal representing the sine of the angle of which $x$ is the rate of change, is developed at the output 17 of one integrator 11 and an output signal representing the cosine of the angle of which $x$ is the rate of change, is developed at the output 17' of the other integrator 11'.

As has been stated previously, the circuits of FIGURE 1 is of limited utility in that the amplitude and phase of the output signals are arbitrary and, moreover, are subject to variation as a result of drift in the integrators 11, 11' and null and possibly, scale errors in the multiplier circuits 13, 13'.

The circuits of FIGURES 2–8 are provided with feedback circuitry 19 connected to the outputs of the integrators 11, 11' and operable to control the sine and cosine output signals as to at least one of the signal parameters amplitude and phase.

Thus, the circuit of FIGURE 2 has been developed from the circuit of FIGURE 1 by the provision of feedback means 19 operable to control the amplitude of the sine and cosine signals developed at the outputs 17, 17'. The feedback circuitry 19 comprises: a first feedback extending between the output and input of one integrator 11, and including a third multiplier circuit 21; a second feedback path extending between the output and input of the other integrator 11' and including a fourth multiplier circuit 21'; and means 23 operable to apply to the third and fourth multiplier circuits 21, 21' an error signal $e$ representing any difference in amplitude which may exist between the sine and cosine signals developed at the outputs 17, 17' of the integrators 11, 11', and an amplitude control signal, here denoted by $a^2$.

The means 23 may comprise a fifth multiplier circuit 25 having a two-fold connection to the output of the integrator 11, so as to produce an output representing the square of the output of integrator 11; a sixth multiplier circuit having a two-fold connection to the output of the integrator 11' so as to produce an output representing the square of the output of integrator 11', and a summing circuit 29 the three inputs of which are connected to the outputs of the fifth and sixth multiplier circuits 25, 25' and to a source 31 of amplitude control signal $a^2$, and the output of which is connected to the third and fourth multipliers 21, 21'. The output of the summing circuit 29 is connected to the third and fourth multiplier circuits via an amplifier 33.

Analysis of the circuit of FIGURE 2 shows that:

$$\left(\frac{d}{dt} + e\right) u = xv$$

$$\left(\frac{d}{dt} + e\right) v = -xu$$

$$e = k(u^2 + v^2 - a^2)$$

The solution of these equations can be expressed as:

$$u = z \sin X$$

and $$v = z \cos X$$

when $$X = b + \int_0^{t_1} x(t) dt$$

$b$ is arbitrary; and $$z = z(t') = \left[\frac{1}{a^2} + \left(\frac{1}{z_0^2} - \frac{1}{a^2}\right) \exp(-2ka^2 t')\right]^{-1/2}$$

where $z_0 = z(0)$.

$z$, which is the amplitude of the output signals, may be seen to converge from any non-zero initial value towards a desired value $a$ at a rate which increases with gain $k$.

Whereas the circuit of FIGURE 2 may be employed to control the amplitude of the output signals $u$ and $v$, the circuits of FIGURES 3–8 are concerned primarily with controlling the phase of the output signals $u$ and $v$. Accordingly in FIGURES 3–7, the circuit part identified as B may be of the form shown in FIGURE 1; but it will be appreciated, that, where the output signals are to be controlled both as to phase and amplitude, the developed circuit of FIGURE 2 may be employed.

The circuits of FIGURES 3–8 are not equivalents; rather are they concerned with controlling the phase of the output signals for different ranges of angle.

Thus the circuit (FIGURE 3) comprises a circuit part B (which, as mentioned, may be of the form shown in FIGURE 1 or as shown in FIGURE 2); a summing circuit 35 having one input 37 connected to the sin X output 17 of the circuit part B and a second input adapted to receive a phase monitoring signal, sin $X_m$, on a second input 37'; a feedback amplifier 39 connected to the output of the summing circuit 35; and a further summing circuit 41, one input of which is connected to the output of the amplifier 39 and a second input of which is connected to the rate signal source $x$, and the output of which is connected to the input to the circuit part B.

It can be shown that the effect of the feedback from the sin X output 17 of the circuit part B is to tend to reduce any phase error $(X - X_m)$ to zero. However, the phase error $(X - X_m)$ is reduced only if cos $X_m$ is positive ($-90° < X_m < +90°$); outside this range the feedback acts in the opposite sense so as to *increase* any small initial phase error.

Moreover the overall loop gain decreases as $X_m \to \pm 90°$ (sin $X_m \to \pm 1$) so that in the neighbourhood of such values of $X_m$ the circuit of FIGURE 3 loses its effectiveness in reducing any phase error $(X - X_m)$.

The circuit shown in FIGURE 4 extends the range of application of the circuit of FIGURE 3 to angles for which cos $X_m$ is negative ($+90° < X_m < 270°$).

In the circuit of FIGURE 4 the output of the summing circuit 35 is connected to a multiplier circuit 43 to which is also connected the cos X output 17' of the circuit part B.

The circuit (FIGURE 4) suffers, however, from the defect similar to that noted in connection with FIGURE 3, that, for angles $X_m$ in the neighbourhood of 90° and 270° the overall loop gain is small and the effectiveness of the circuit in reducing phase error when the angle $X_m$ is in the neighbourhood of 90° and 270° is poor.

Figure 5:
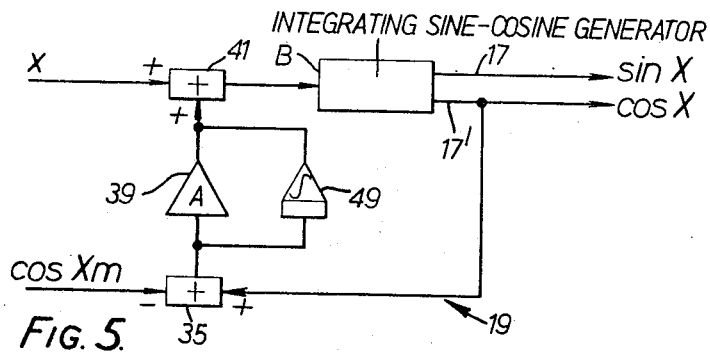

A circuit analogous to the circuit of FIGURE 3 may be constructed which is suitable for angles $X_m$ lying between 0 and 180°. The circuit is shown in FIGURE 5 from which it may be seen that, in contradistinction to the circuit of FIGURE 3, one connection to the summing circuit 35 is from the cos X output 17' of the circuit part B and the other connection to the summing circuit 35 is adapted to receive a cos $X_m$ phase monitoring signal. The circuit of FIGURE 5 cannot deal with angles $X_m$ in the range 180° to 360°; for the latter range any initially small phase error $(X - X_m)$ would be increased since, for such angles, sin $X_m$ is negative.

Figure 6:
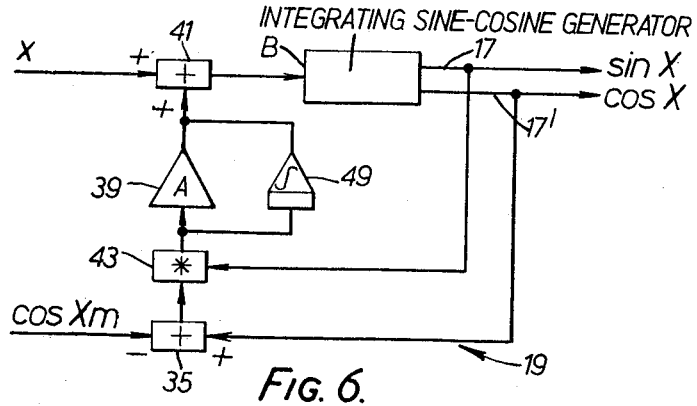
Figure 7:
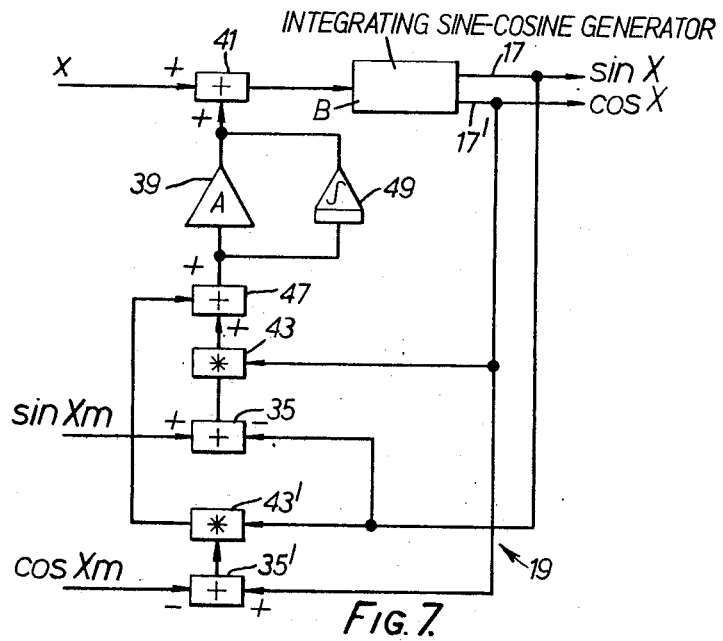
Figure 8:
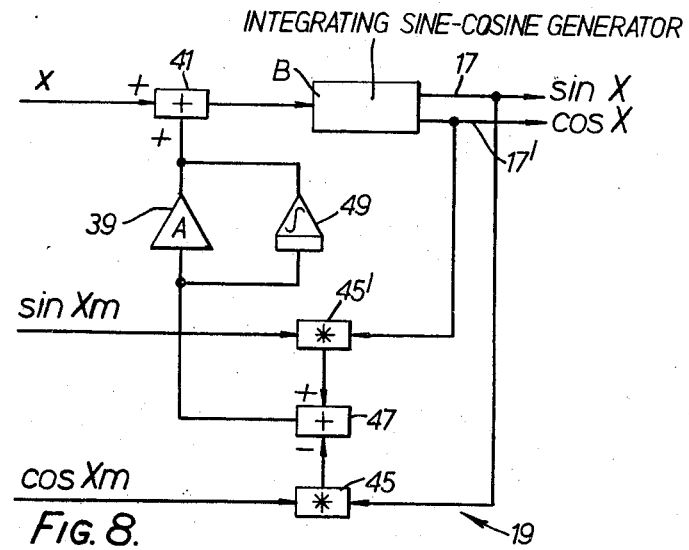

To avoid the latter limitation a circuit (FIGURE 6) analogous to the circuit of FIGURE 4 may be employed. In the circuit of FIGURE 6 the sin X output 17 of the circuit part B is connected to a multiplier circuit 43 to which is also connected the output of the summing circuit 35 and the output of which is connected to an amplifier whose output is, in turn, connected to a summing circuit 41 adapted to receive the rate signal $x$.

Whereas the circuits of FIGURES 3 and 4 are of little value for angles X in the neighbourhood of 90° and 270°, the circuits of FIGURES 5 and 6 are of little value for angles in the neighbourhood of 0° and 180°.

By combining the circuits of FIGURES 4 and 6 there results a circuit (FIGURE 7) which is effective to slave the phase of the sin X output 17 of the circuit to the phase monitoring or reference signal sin $X_m$ and the phase of the cos X output 17' to the phase monitoring or reference signal cos $X_m$.

The direct combination of the circuits of FIGURES 4 and 6 so as to achieve this end results in a certain redundancy of components. Such a circuit may, however, be reduced to the circuit shown in FIGURE 8 so as to avoid such redundancy.

As shown (FIGURE 8), the sin X output 17 of the circuit is connected to a multiplier circuit 45 having an input adapted to receive a phase monitoring signal cos $X_m$; the cos X output 17' of the circuit is connected to a multiplier circuit 45' having an input adapted to receive a phase monitoring signal sin $X_m$; The outputs of the multiplier circuits 45 and 45' are connected to a summing circuit 47; and the output of the latter summing circuit is connected to an amplifier 39 the output of which is connected to a summing circuit 41 having an input to which the rate signal $x$ is applied.

In each of the FIGURES 3–8 there is shown an integrator 49 which may, optionally, be connected across the amplifier 39. The latter integrator is operative to ensure that, in the steady state, i.e. with X steady, there is no residual phase error in the outputs of the circuit as a result of a "null error" in the rate signal.

In each of FIGURES 3 to 8 the availability of phase monitoring signals, sin $X_m$ and cos $X_m$, is postulated.

Since the latter signals are measures of the sine and cosine of an angle of which $x$ is the time rate of change, it might be wondered why the necessity for the circuits of FIGURES 3 to 7 arises.

That such circuits are of real utility arises from the fact that although the monitoring signals sin $X_m$, cos $X_m$ give a reliable long term measure of the angle (i.e. are not subject to drift) they are subject to transient errors, particularly when the angle being represented changes abruptly. One reason for such errors may be a slow time response in circuitry employed to develop the phase monitoring signals.

As an example of the sort of input signal for which the circuit might be usefully employed the case may be considered where the angle to be measured is the heading of vehicle relative to magnetic North.

In such a case rate signal $x$ might be derived from a rate gyro (which rate gyro is subject to null and scale errors) while the phase reference or monitoring signals sin $X_m$, cos $X_m$ might be derived from some compass system which is heavily damped.

The circuits of FIGURES 3 to 8, by utilising not only the phase monitoring signals, but also the rate signal $x$, produce sinusoidal output signals the long term accuracy of which is determined by the phase monitoring signals and the short term accuracy of which is determined by the (integrated) rate signal.

The multiplying integrating and summing circuits described may be standard units well known to those skilled

We claim:
1. A function generator responsive to a time rate of change of angled signal to produce a first output signal representative of the sine of the angle and a second output signal representative of the cosine of the angle, said function generator comprising
   first and second multiplying circuits each having a first and second inputs and an output, the two first inputs being connected together to receive said rate of change of angle signal,
   first and second integrator circuits each having an input and an output, the inputs of said first and second integrator circuits being respectively connected to the outputs of said first and second multiplying circuits, said first integrator circuit output being connected to the second input of said second multiplying circuit and said second integrator circuit output being connected to the second input of said first multiplying circuit said first integrator circuit output providing said first output signal and said second integrator circuit outputs providing said second output signal, and
   feedback control means having first and second inputs and first and second outputs, the first and second inputs of the feedback control means being respectively connected to the outputs of the first and second integrator circuits and the first and second outputs of the feedback control means being respectively connected to the inputs of the first and second integrator circuits for controlling the peak amplitudes of the first and second output signals.

2. A function generator according to claim 1, in which said feedback control means comprises
   a third multiplying circuit having first and second inputs and an output, the third multiplying circuit output being connected to the input of said first integrator circuit, and the first input of the third multiplying circuit being connected to the output of said first integrator circuit,
   a fourth multiplying circuit having first and second inputs and an output, said fourth multiplying circuit output being connected to the input of said second integrator circuit, and the first input of the fourth multiplying circuit being connected to the output of said second integrator circuit,
   means generating an amplitude control signal,
   control means connected to receive the said first and second output signals and the amplitude control signal to provide an error signal output representative of the difference between the amplitude control signal and the peak amplitude of the output signals, and
   means for applying said error signal output to the second input of each of said third ond fourth multiplying circuits.

3. A function generator according to claim 2, in which said control means comprises
   first squaring means connected to the output of said first integrator circuit and having an output at which is produced a signal representing the square of the first output signal,
   second squaring means connected to the output of said second integrator circuit and having an output at which is produced a signal representing the square of the second output signal, and
   summing means connected to the outputs of the first and second squaring means and also connected to receive said amplitude control signal, said summing means having an output at which is produced said error signal.

4. A function generator according to claim 3, in which said summing means includes amplifying means.

5. A function generator according to claim 3, in which said first squaring means comprises a fifth multiplying circuit having two inputs both connected to the output of said first integrator circuit and an output at which is produced the said signal representing the square of the first output signal, and
   said second squaring means comprises a sixth multiplying circuit having two inputs both connected to the output of said second integrator circuit and an output at which is produced the said signal representing the square of said second output signal.

6. A function generator responsive to a time rate of change of angle signal to produce a first output signal representative of the sine of the angle and a second output signal representative of the cosine of the angle, said function generator comprising
   first and second multiplying circuits each having first and second inputs and an output, the two first inputs being connected together to receive the said rate of change of angle signal,
   first and second integrator circuits each having an input and output, the inputs of said first and second integrator circuits being respectively connected to the outputs of said first and second multiplying circuits, the output of the first integrator circuit being connected to the second input of the second multiplying circuit, and the output of the second integrator circuit being connected to the second input of the first multiplying circuit, said first integrator circuit output providing said first output signal and said second integrator circuit output providing said second output signal, and
   feedback control means connected between the output of at least one said integrator circuit and the said first inputs of the first and second multiplying circuits for controlling the phases of the output signals.

7. A function generator according to claim 6, in which said feedback control means comprises
   means generating a phase reference signal,
   difference means having first and second inputs and an output, said first and second inputs being connected respectively to receive said phase reference signal and the output signal from the output of said one integrator circuit, whereby the output of said difference means provides an error signal dependent on the difference between the signals received at its inputs, and
   summing means having said first and second inputs respectively connected to receive said rate of change of angle signal and said error signal, and an output connected to the first inputs of said first and second multiplying circuits.

8. A function generator according to claim 7, in which said difference means includes amplifying means.

9. A function generator according to claim 6, in which said feedback control means comprises
   means generating a phase reference signal,
   difference means having first and second inputs and an output, said first and second inputs being respectively connected to receive said phase reference signal and the output signal produced at the output of said one integrator circuit, whereby the output of the difference means produces a difference signal dependent on the difference between the signals applied to its inputs,
   a fifth multiplying circuit having first and second inputs and an output, the first and second inputs being connected respectively to the output of the difference means and the output of the other said integrator circuit, and
   summing means having first and second inputs and an output, the first input of the summing means being connected to receive said rate of change of angle signal, said second input of the summing means being connected to the output of the fifth multiplying circuit, and the output of said summing means being connected to the first inputs of said first and second multiplying circuits.

10. A function generator according to claim 9, in which said fifth multiplying circuit includes an amplifier.

11. A function generator according to claim 10, in which said fifth multiplying circuit includes a third integrator circuit connected in parallel with said amplifier.

12. A function generator according to claim 6, in which said feedback control means comprises
- first reference means generating a first phase reference signal,
- first difference means having first and second inputs and an output, said first and second inputs being respectively connected to receive said first phase reference signal and the output signal from said one integrator circuit whereby to provide a first difference signal output at the output of said first difference means dependent on the phase difference between the first phase reference signal and the output signal of said one integrator circuit,
- a fifth multiplying circuit having first and second inputs and an output, said first and second inputs being respectively connected to receive said phase difference signal and the output signal from the other of said integrator circuits,
- second reference means generating a second phase reference signal displaced by 90° from said first phase reference signal,
- second difference means having first and second inputs and an output, said first and second inputs being respectively connected to receive the second phase reference signal and the output signal from the other integrator circuit whereby to provide at the output of the second difference means a second difference signal dependent on the difference between the second phase reference signal and the output signal from said other integrator circuit, and
- summing means having first, second, and third inputs and an output, said first input being connected to receive said rate of change of angle signal and said second and third inputs being respectively connected to the outputs of said fifth and sixth multiplying circuits, and said output of the summing means being connected to the first inputs of the first and second multiplying circuits.

13. A function generator according to claim 6, in which said feedback control means comprises
- first and second reference means generating first and second phase reference signals respectively as a sine wave and a cosine wave,
- a fifth multiplying circuit having first and second inputs and an output, the first input of the fifth multiplying circuit being connected to receive said first phase reference signal and the second input of the fifth multiplying circuit being connected to receive the said second output signal,
- a sixth multiplying circuit having first and second inputs and an output, the first input of the sixth multiplying circuit being connected to receive said second phase reference signal and the second input of the sixth multiplying circuit being connected to receive the said first output signal, and
- summing means having first, second and third inputs and an output, said first input being connected to receive the said rate of change of angle signal and said second and third inputs being respectively connected to the outputs of said fifth and sixth multiplying circuits, the output of said summing means being connected to the first and second inputs of said first and second multiplying circuits.

14. A function generator according to claim 13, in which said summing means comprises
- a first summing circuit having first and second inputs respectively forming the second and third inputs of said summing means, and an output,
- a second summing circuit having first and second inputs, said first input forming the said first input of said summing means and the output of said second summing circuit forming the output of said summing means, and
- an amplifier connected between the output of said first summing circuit and the said second input of said second summing circuit.

15. A function generator according to claim 14, in which said summing means includes a third integrator circuit connect in parallel with said amplifier.

16. A function generator responsive to a time rate of change of angle signal to produce a first output signal representative of the cosine of the angle, said function generator comprising
- first and second multiplying circuits each having a first and second inputs and an output, the two first inputs being connected together to receive said rate of change of angle signal,
- first and second integrator circuits each having an input and an output, the inputs of said first and second integrator circuits being respectively connected to the outputs of said first and second multiplying circuits, said first integrator circuit output being connected to the second integrator circuit output being connected to the second input of said first multiplying circuit said first integrator circuit output providing said first output signal and said second integrator circuit outputs providing said second output signal,
- first feedback control means connected from the outputs of the two integrator circuits to the two integrator circuits to the two inputs thereof for controlling the peak amplitudes of the first and second output signals, and
- second feedback means connected between the output of at least one integrator circuit and the said first inputs at the first and second multiplying circuits for controlling the phases of the output signals.

References Cited

UNITED STATES PATENTS

| | | | |
|---|---|---|---|
| 2,752,092 | 6/1956 | McDonal | 235—183 |
| 2,927,734 | 3/1960 | Vance | 235—189 |
| 2,995,302 | 8/1961 | Ingwerson et al. | 235—189 X |
| 3,017,105 | 1/1962 | Van Alstyne et al. | 235—186 |
| 3,167,649 | 1/1965 | Walp | 235—194 |
| 3,278,736 | 10/1966 | Pastoriza | 235—184 |
| 3,311,738 | 3/1967 | Makow | 235—186 X |
| 3,404,262 | 10/1968 | Udall | 235—183 |

FOREIGN PATENTS 151,051  4/1961  USSR.

MALCOLM A. MORRISON, Primary Examiner

R. W. WEIG, Assistant Examiner

U.S. Cl. X.R.

235—183, 184, 189, 194